United States Patent
Hara et al.

(10) Patent No.: US 10,313,974 B2
(45) Date of Patent: Jun. 4, 2019

(54) BASE STATION, WIRELESS TERMINAL, COMMUNICATION SYSTEM, COMMUNICATION METHOD, AND PROGRAM

(71) Applicants: NEC Communication Systems, Ltd, Tokyo (JP); NEC Corporation, Tokyo (JP)

(72) Inventors: Yukihiro Hara, Tokyo (JP); Yohei Miyama, Tokyo (JP); Tomonori Kumagai, Tokyo (JP); Shinji Masuda, Tokyo (JP); Kenki Takagi, Tokyo (JP)

(73) Assignees: NEC COMMUNICATION SYSTEMS, LTD., Tokyo (JP); NEC CORPORATION, Tokyo (JP)

( * ) Notice: Subject to any disclaimer, the term of this patent is extended or adjusted under 35 U.S.C. 154(b) by 199 days.

(21) Appl. No.: 15/035,471

(22) PCT Filed: Sep. 5, 2014

(86) PCT No.: PCT/JP2014/004577
§ 371 (c)(1),
(2) Date: May 9, 2016

(87) PCT Pub. No.: WO2015/072053
PCT Pub. Date: May 21, 2015

(65) Prior Publication Data
US 2016/0295512 A1    Oct. 6, 2016

(30) Foreign Application Priority Data
Nov. 13, 2013 (JP) ................................ 2013-234728

(51) Int. Cl.
*H04W 52/02* (2009.01)
*H04L 29/12* (2006.01)
(Continued)

(52) U.S. Cl.
CPC ..... *H04W 52/0229* (2013.01); *H04L 61/6081* (2013.01); *H04W 12/06* (2013.01);
(Continued)

(58) Field of Classification Search
CPC . H04W 52/0229; H04W 12/06; H04W 84/12; H04W 88/02; H04W 88/08;
(Continued)

(56) References Cited

U.S. PATENT DOCUMENTS

2006/0112287 A1* 5/2006 Paljug ................... G06F 1/3209
                                                                  713/300
2012/0069893 A1    3/2012  Shirakata et al.
2013/0329621 A1   12/2013  Kondo et al.

FOREIGN PATENT DOCUMENTS

EP        2555438 A1      2/2013
JP     2005-328515 A     11/2005
(Continued)

OTHER PUBLICATIONS

International Search Report corresponding to PCT/JP2014/004577 dated Oct. 28, 2014 (2 pages).
(Continued)

*Primary Examiner* — Luat Phung
(74) *Attorney, Agent, or Firm* — Wilmer Cutler Pickering Hale and Dorr LLP

(57) ABSTRACT

A base station includes a wakeup signal transmission part transmitting transmission signal information to a wireless terminal by wireless communication. The transmission signal information includes a wakeup signal starting a given function included by the wireless terminal. The wakeup signal transmission part transmits the transmission signal information including connection information in addition to the wakeup signal to the wireless terminal. The connection information is information for causing the wireless terminal
(Continued)

of a destination of transmission of the wakeup signal to connect by wireless communication using the given function.

9 Claims, 12 Drawing Sheets

(51) Int. Cl.
    *H04W 12/06*     (2009.01)
    *H04W 40/00*     (2009.01)
    *H04W 84/12*     (2009.01)
    *H04W 88/02*     (2009.01)
    *H04W 88/08*     (2009.01)

(52) U.S. Cl.
    CPC .......... *H04W 40/005* (2013.01); *H04W 84/12* (2013.01); *H04W 88/02* (2013.01); *H04W 88/08* (2013.01); *Y02D 70/00* (2018.01); *Y02D 70/142* (2018.01); *Y02D 70/144* (2018.01); *Y02D 70/162* (2018.01); *Y02D 70/166* (2018.01)

(58) Field of Classification Search
    CPC .............. H04L 61/6081; Y02D 70/142; Y02D 70/144; Y02D 70/162; Y02D 70/166; Y02D 70/00
    See application file for complete search history.

(56) References Cited

FOREIGN PATENT DOCUMENTS

| | | |
|---|---|---|
| JP | 2006-060336 A | 3/2006 |
| JP | 2006-135874 A | 5/2006 |
| JP | 2011-049721 A | 3/2011 |
| JP | 2012-175544 A | 9/2012 |
| JP | 2013-009431 A | 1/2013 |
| JP | 2013-162476 A | 8/2013 |
| WO | WO-2011/121690 A1 | 10/2011 |

OTHER PUBLICATIONS

Japanese Office Action issued by the Japan Patent Office for Japanese Application No. 2015-547605 dated Mar. 14, 2017 (6 pages).

* cited by examiner

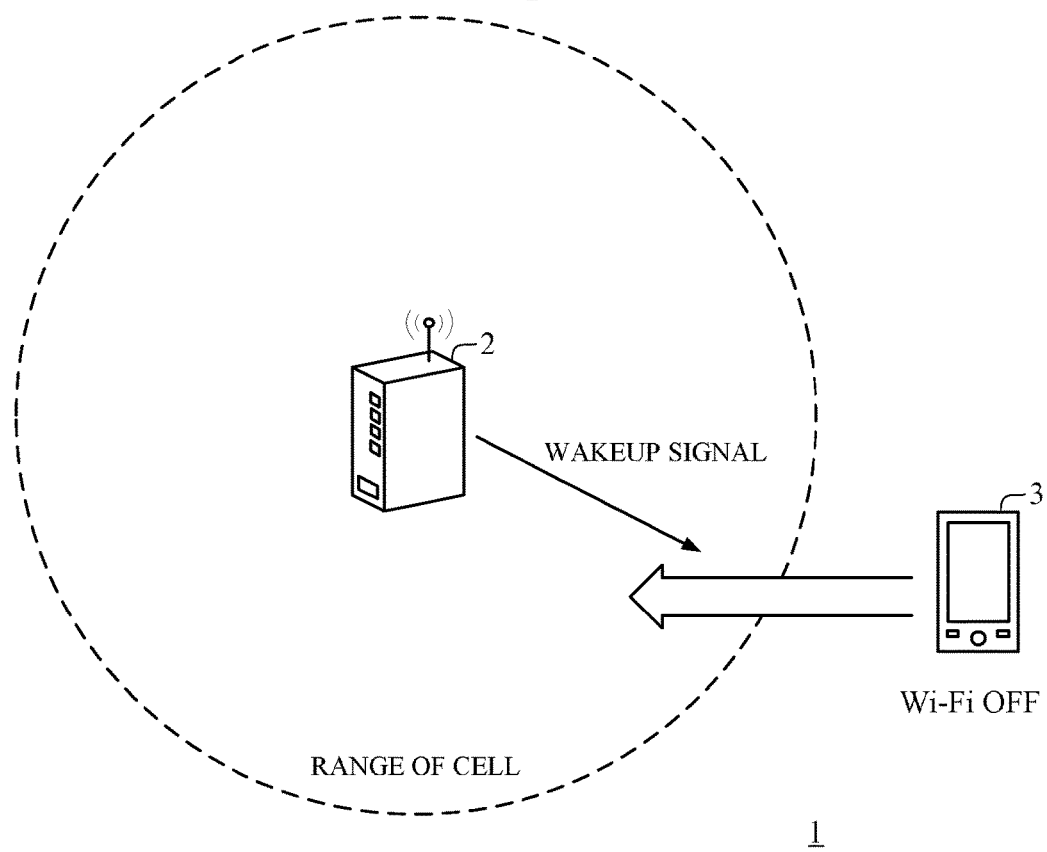
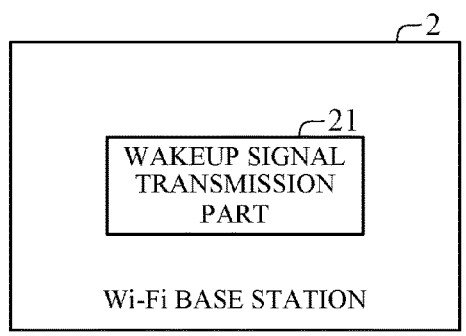

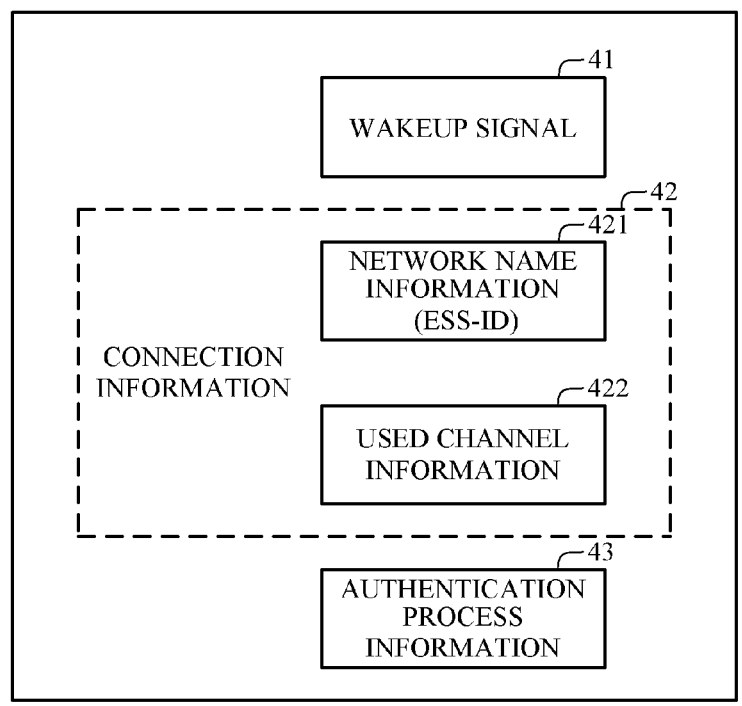
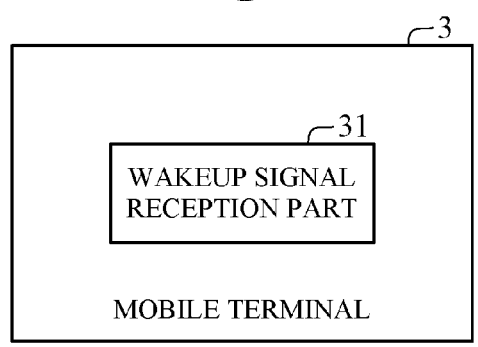

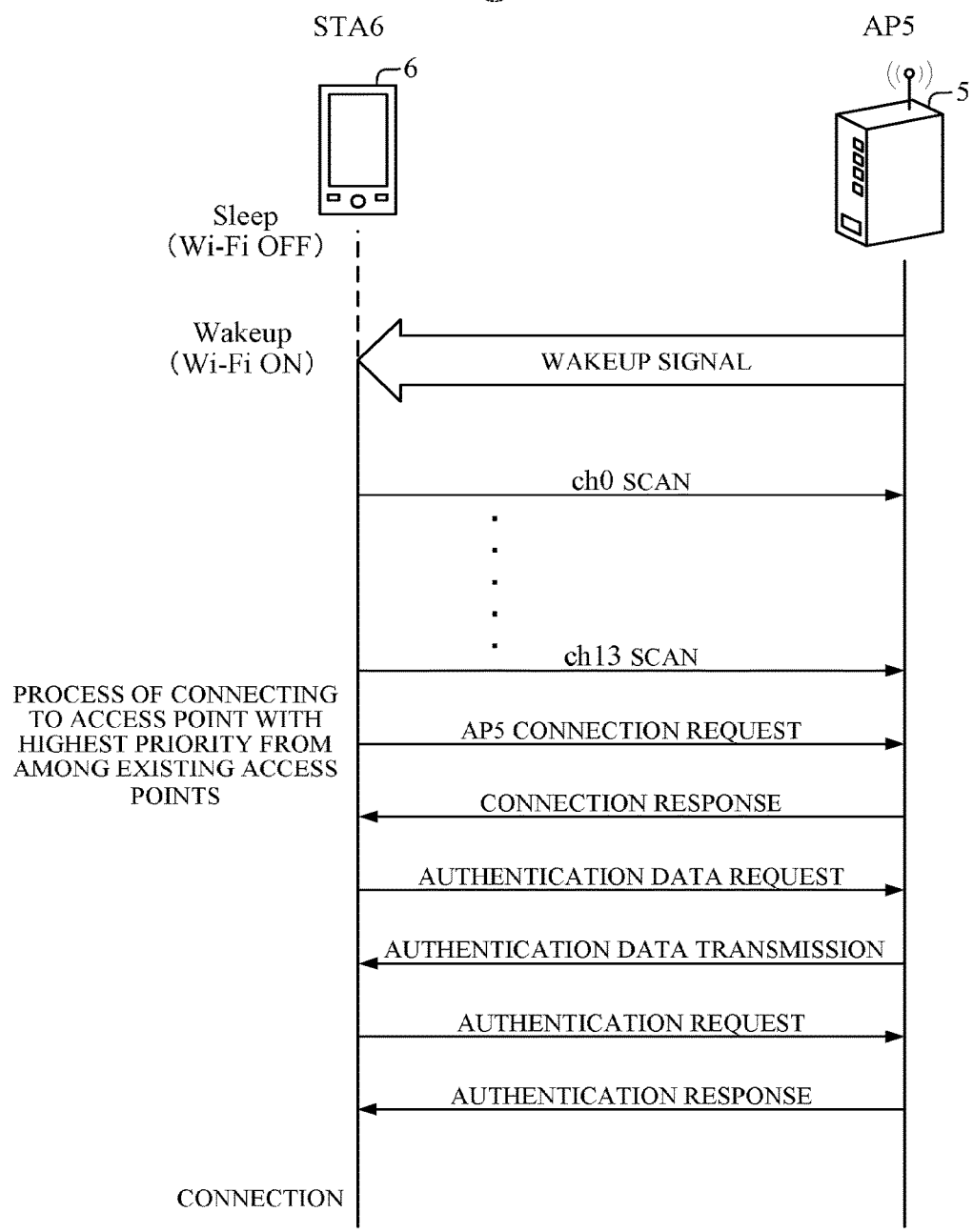

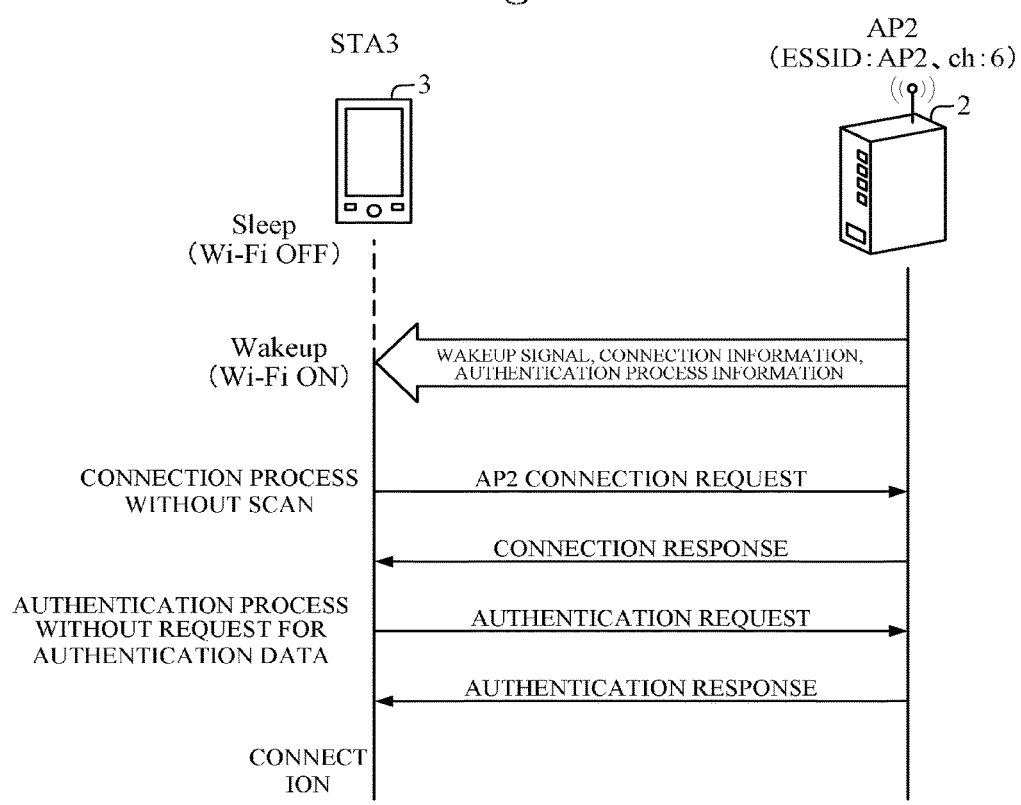

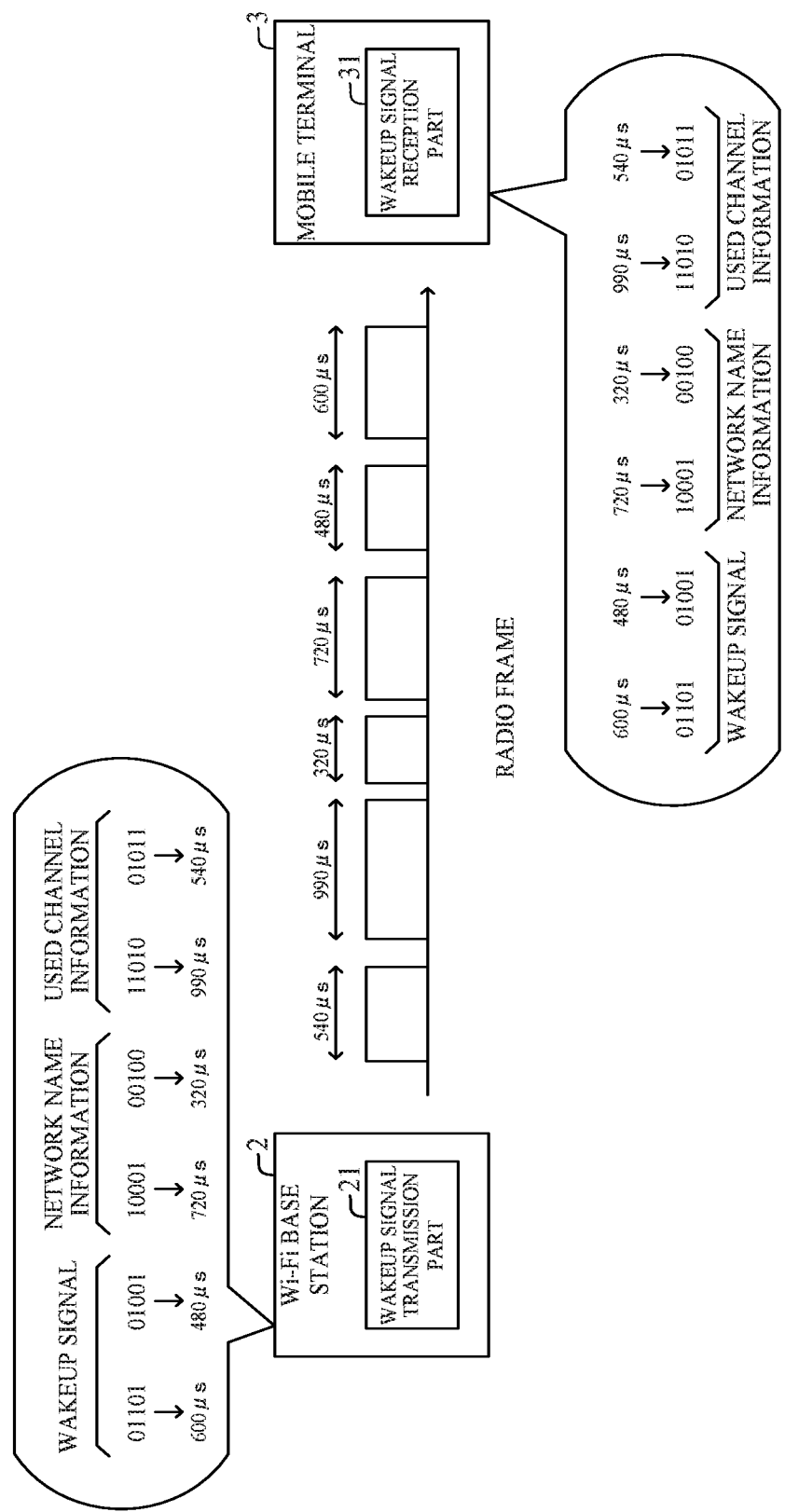

Fig.8

・BIT STRING AND FRAME LENGTH CORRESPONDENCE TABLE

| BIT STRING | FRAME LENGTH($\mu$s) |
|---|---|
| 00000 | 200 |
| 00001 | 230 |
| 00010 | 260 |
| 00011 | 290 |
| 00100 | 320 |
| ⋮ | ⋮ |
| 11111 | 1140 |

Fig.9

・FRAME LENGTH AND BIT STRING CORRESPONDENCE TABLE

| FRAME LENGTH($\mu$s) | BIT STRING |
|---|---|
| 200 | 00000 |
| 230 | 00001 |
| 260 | 00010 |
| 290 | 00011 |
| 320 | 00100 |
| ⋮ | ⋮ |
| 1140 | 11111 |

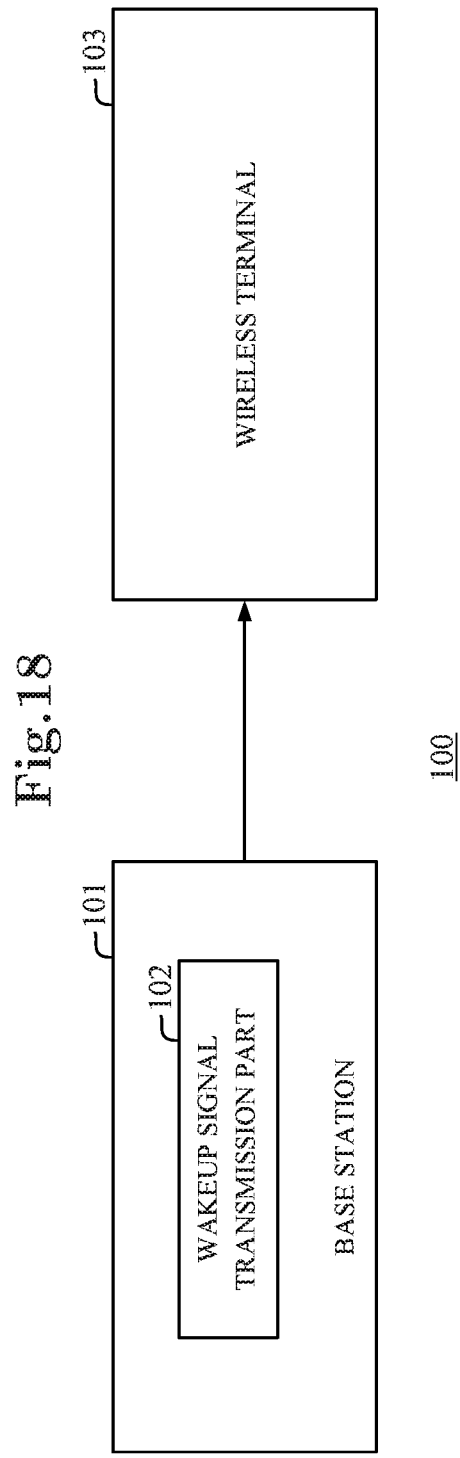

BASE STATION, WIRELESS TERMINAL, COMMUNICATION SYSTEM, COMMUNICATION METHOD, AND PROGRAM

CROSS-REFERENCE TO RELATED APPLICATIONS

This application is a national stage application of International Application No. PCT/JP2014/004577 entitled "Base Station, Wireless Terminal, Communication System, Communication Method, and Program" filed on Sep. 5, 2014, which claims priority to Japanese Application 2013-234728 filed on Nov. 13, 2013, the disclosures of which are hereby incorporated by reference in their entirety.

TECHNICAL FIELD

The present invention relates to a base station, a wireless terminal, a communication system, a communication method, and a program. More specifically, the present invention relates to a base station, a wireless terminal, a communication system, a communication method and a program which execute on-off control of a given function with a radio signal.

BACKGROUND ART

As wireless terminals such as a smartphone becomes popular, the traffic of mobile communications is increasing more and more. This consequently causes the capacity shortage of a backbone network and begins to significantly influence on usability for end users.

A possible solution to such a problem is data offloading using Wi-Fi. However, when Wi-Fi is on, the wireless terminal regularly searches for a connectable base station (AP, Access Point) therearound. This consequently causes the wireless terminal to continue power consumption and rapidly exhaust the battery thereof. Therefore, Wi-Fi is usually kept off, so that data offloading is not widespread.

An answer to such a problem is a wakeup system. A wakeup system generally keeps Wi-Fi off and, only when Wi-Fi is available, automatically turns on Wi-Fi, thereby limiting power consumption by Wi-Fi in the reception standby state.

A technique using the wakeup system is disclosed in Patent Documents 1 and 2, for example. Patent Documents 1 and 2 describe a technique of starting a wireless base station and a wireless router with a wakeup signal sent from a terminal. Use of the technique allows a wireless base station and a wireless router to be in the sleep state when not in use and start when in use.
Patent Document 1: Japanese Unexamined Patent Application Publication No. JP-A 2013-162476
Patent Document 2: Japanese Unexamined Patent Application Publication No. JP-A 2013-009431

However, the technique described in Patent Documents 1 and 2 requires a wireless terminal to search for a connectable Wi-Fi base station (AP) and acquire connection information of a channel (ch) and the like when Wi-Fi is turned on. As a result, it takes time before a connection process is executed after Wi-Fi is turned on.

Further, a Wi-Fi base station needs to authenticate an unspecified terminal in Wi-Fi connection. Therefore, a WI-Fi base station needs to acquire necessary information for authentication every time before executing an authentication process, and consequently, it also takes time to execute the authentication process.

Thus, a system which wakes a terminal up and uses Wi-Fi has a problem that it takes time before communication is established.

SUMMARY

Accordingly, an object of the present invention is to provide a base station which solves the abovementioned problem, namely, the problem that it takes time before communication is established in a system using a wakeup signal.

In order to achieve the object, a base station as an aspect of the present invention includes a wakeup signal transmission part transmitting transmission signal information to a wireless terminal by wireless communication, and the transmission signal information includes a wakeup signal starting a given function included by the wireless terminal.

The wakeup signal transmission part transmits the transmission signal information including connection information in addition to the wakeup signal to the wireless terminal, and the connection information is information for causing the wireless terminal of a destination of transmission of the wakeup signal to connect by wireless communication using the given function.

Further, a wireless terminal as another aspect of the present invention includes a wakeup signal reception part receiving a wakeup signal and connection information from a base station, and the connection information is information for connecting to the base station by wireless communication using a given function.

The wireless terminal starts the given function in response to the wakeup signal received by the wakeup signal reception part, and executes a connection process by the started given function using the connection information.

Further, in a communication system as another aspect of the present invention:
a base station includes a wakeup signal transmission part transmitting transmission signal information to a wireless terminal by wireless communication, and the transmission signal information includes a wakeup signal starting a given function included by the wireless terminal;
the wakeup signal transmission part transmits the transmission signal information including connection information in addition to the wakeup signal to the wireless terminal, and the connection information is information for causing the wireless terminal of a destination of transmission of the wakeup signal to connect by wireless communication using the given function; and
upon receiving the transmission signal information including the wakeup signal and the connection information, the wireless terminal starts the given function included by the wireless terminal in response to the wakeup signal and executes a connection process by the started given function using the connection information.

Further, a communication method as another aspect of the present invention includes:
by a base station, transmitting a wakeup signal and connection information to a wireless terminal, the wakeup signal starting a given function included by the wireless terminal, the connection information being information for causing the wireless terminal of a destination of transmission of the wakeup signal to connect by wireless communication using the given function; and by the wireless terminal, starting the given function in response to the wakeup signal and executing a connection process by the started given function using the connection information when receiving the wakeup signal and the connection information.

Further, a program as another aspect of the present invention is a computer program including instructions for causing a base station to realize a wakeup signal transmission unit transmitting transmission signal information to a wireless terminal by wireless communication, and the transmission signal information includes a wakeup signal starting a given function included by the wireless terminal.

The wakeup signal transmission unit has a function of transmitting the transmission signal information including connection information in addition to the wakeup signal to the wireless terminal, and the connection information is information for causing the wireless terminal of a destination of transmission of the wakeup signal to connect by wireless communication using the given function.

With the configurations as described above, the present invention can provide a base station which can speedily establish communication in a system using a wakeup signal.

BRIEF DESCRIPTION OF DRAWINGS

FIG. 1 is a diagram showing the configuration of a communication system in a first exemplary embodiment;

FIG. 2 is a block diagram showing the configuration of a Wi-Fi base station shown in FIG. 1;

FIG. 3 is a block diagram showing the configuration of transmission signal information transmitted by a wakeup signal transmission part shown in FIG. 2;

FIG. 4 is a block diagram showing the configuration of a mobile terminal shown in FIG. 1;

FIG. 5 is a sequence diagram showing the operation of a general communication system;

FIG. 6 is a sequence diagram showing the operation of the communication system in the first exemplary embodiment;

FIG. 7 is a diagram showing the configuration in information transmission in a second exemplary embodiment;

FIG. 8 is a diagram showing an example of the configuration of a bit string and frame length correspondence table in the second exemplary embodiment;

FIG. 9 is a diagram showing an example of the configuration of a frame length and bit string correspondence table in the second exemplary embodiment;

FIG. 18 is a block diagram showing the overview of the configuration of a communication system 100 in a sixth exemplary embodiment.

EXEMPLARY EMBODIMENTS

First Exemplary Embodiment

Figure 10:
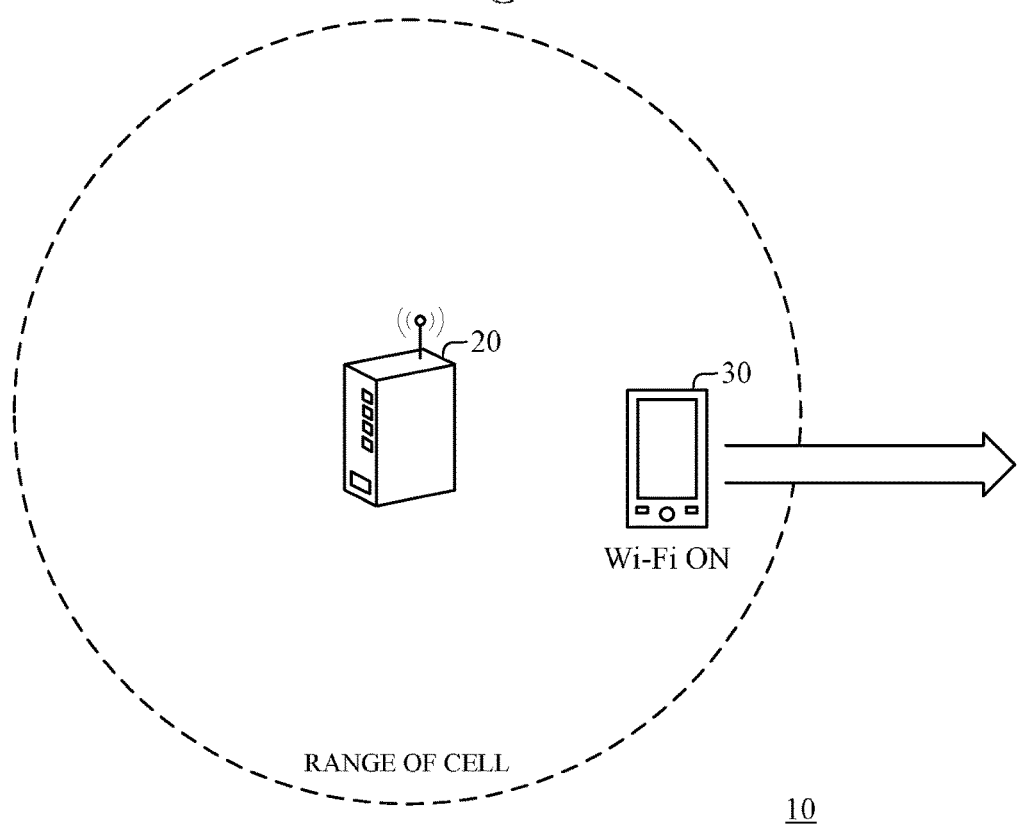
FIG. 10 is a diagram showing an example of the configuration of a communication system in a third exemplary embodiment.

A first exemplary embodiment of the present invention will be described referring to FIGS. 1 to 6. FIG. 1 is a diagram showing the configuration of a communication system 1 in a first exemplary embodiment. FIG. 2 is a block diagram showing the configuration of a Wi-Fi base station 2 shown in FIG. 1. FIG. 3 is a block diagram showing the configuration of transmission signal information transmitted by a wakeup signal transmission part 21 shown in FIG. 2. FIG. 4 is a block diagram showing the configuration of a mobile terminal 3 shown in FIG. 1. FIG. 5 is a sequence diagram showing the operation executed when an AP 5 and a STA 6 connect to each other in a general communication system. FIG. 6 is a sequence diagram showing the operation executed when the Wi-Fi base station 2 and the mobile terminal 3 of the communication system 1 connect to each other in the first exemplary embodiment.

(Configuration)

In the first exemplary embodiment of the present invention, the communication system 1 including the Wi-Fi base station 2 and the mobile terminal 3 as shown in FIG. 1 will be described. The Wi-Fi base station 2 (base station, AP, Access Point) in this exemplary embodiment includes a function of transmitting a wakeup signal 41 as described later. The wakeup signal 41 is a signal which switches a Wi-Fi (Wireless Fidelity) function of the mobile terminal 3 (wireless terminal, STA, Station) receiving the wakeup signal 41 from OFF to ON.

Herein, Wi-Fi of the mobile terminal 3 is kept OFF at an ordinary time (for example, Wi-Fi is not used because the mobile terminal 3 is outside the range of the cell of the Wi-Fi base station 2). When Wi-Fi of the mobile terminal 3 is turned on, the mobile terminal 3 regularly searches for a connectable Wi-Fi base station therearound. This causes the mobile terminal 3 to continue power consumption and rapidly exhaust the battery thereof.

The Wi-Fi base station 2 is a base station which includes a function as a wireless LAN access point connecting terminals with a wireless LAN (Local Area Network) and a function as a router connecting different networks. In other words, the Wi-Fi base station 2 includes a function as a general wireless LAN router. Because this is a known technique, a detailed description thereof will be omitted.

Further, the Wi-Fi base station 2 includes a wakeup signal transmission part 21 as shown in FIG. 2.

The wakeup signal transmission part 21 transmits transmission signal information including a wakeup signal 41 regularly at predetermined intervals. To be specific, as shown in FIG. 3, the wakeup signal transmission part 21 in this exemplary embodiment transmits, as transmission signal information, connection information 42 composed of network name information 421 and used channel information 422 and authentication process information 43 in addition to the wakeup signal 41. The wakeup signal transmission part 21 is included by the Wi-Fi base station 2, and transmits transmission signal information via an antenna part and the like used for realizing the function as the wireless LAN access point.

The wakeup signal 41 is a signal which switches the Wi-Fi function of the mobile terminal 3 having received this wakeup signal 41 from OFF to ON. As described above, the Wi-Fi base station 2 transmits the wakeup signal 41 at regular intervals. Therefore, the mobile terminal 3 entering the range of the cell of the Wi-Fi base station 2 receives the wakeup signal 41 transmitted by the Wi-Fi base station 2. As a result, the Wi-Fi function of the mobile terminal 3 is automatically switched from OFF to ON.

Meanwhile, the wakeup signal 41 may include terminal specification information which specifies a target to wake up. Herein, terminal specification information is a group ID which varies from carrier to carrier, a terminal ID which varies from terminal to terminal, and the like. For example, it is possible to wake only a terminal of a specific carrier up by transmitting the wakeup signal 41 including terminal specification information specifying a carrier ID.

The connection information 42 is composed of the network name information 421 and the used channel information 422 as described above.

The network name information 421 is information for identifying a network which the mobile terminal 3 of a destination for transmission of this network name information 421 connects to. To be specific, the network name information 421 in this exemplary embodiment is ESS-ID (Extended Service Set Identifier). In other words, the network name information 421 in this exemplary embodiment shows an identifier of a network in IEEE 802.11 wireless LAN. When receiving the network name information 421, the mobile terminal attempts to connect to a network (the Wi-Fi base station 2) shown by this network name information.

The used channel information 422 is information showing a frequency band to be used in wireless communication performed between the Wi-Fi base station 2 and the mobile terminal 3. The used channel information 422 in this exemplary embodiment shows any one of channels 1*ch* to 13*ch*. For example, the Wi-Fi base station 2 selects a channel which is determined to be the least-interference on the basis of information of a channel used in wireless communication and the like. Then, the Wi-Fi base station 2 transmits the used channel information 422 showing the selected channel to the mobile terminal 3.

A channel shown by the used channel information 422 is not necessarily limited to any one of the channels 1*ch* to 13*ch*. For example, the used channel information 422 may show any one of channels 1*ch* to 14*ch*. Moreover, for example, the used channel information 422 may show two channels adjacent to each other. The used channel information 422 can be composed of information showing a channel in accordance with the standard of wireless communication and channel bonding.

The authentication process information 43 shows information necessary for execution of an authentication process. That is to say, the authentication process information 43 shows information necessary for the Wi-Fi base station 2 to execute the authentication process among ESS-ID, MAC address, user name, password and so on. Transmitting such authentication process information to the mobile terminal 3 in advance allows the mobile terminal 3 to speedily make an authentication request as described later.

As described before, the authentication process information 43 in this exemplary embodiment is transmitted simultaneously with the wakeup signal 41. That is to say, the mobile terminal 3 receiving the authentication process information 43 is thought to be a wakeup target which is a limited counterpart. Further, the Wi-Fi base station 2 can distribute information to the mobile terminal 3 of the wakeup target in real time. Therefore, the Wi-Fi base station 2 can transmit the authentication process information 43 as information requiring execution of the authentication process to the mobile terminal 3 in advance.

The Wi-Fi base station 2 (the wakeup signal transmission part 21 thereof) transmits the wakeup signal 41, connection information 42 and authentication process information 43 described above at predetermined intervals. Therefore, when entering the range of the cell of the Wi-Fi base station 2, the mobile terminal 3 receives the wakeup signal 41, connection information 42 and authentication process information 43 regularly transmitted by the Wi-Fi base station 2. Now the configuration of the mobile terminal 3 will be described referring to FIG. 4.

The mobile terminal 3 in this exemplary embodiment is a wireless terminal such as a smartphone including a wireless communication function using Wi-Fi. The mobile terminal 3 in this exemplary embodiment is configured to be able to switch the Wi-Fi function between on and off. Because a general configuration in the configuration of the mobile terminal 3 is a known technique, a description thereof will be omitted.

The mobile terminal 3 includes a wakeup signal reception part 31 as shown in FIG. 4. Moreover, the mobile terminal 3 includes a Wi-Fi function control part, which is not shown in the drawings.

The wakeup signal reception part 31 receives the wakeup signal 41, connection information 42 and authentication process information 43 transmitted by the Wi-Fi base station 2 (the wakeup signal transmission part thereof). The mobile terminal 3 executes a process, which will be described later, by using the wakeup signal 41, connection information 42 and authentication process information 43 received by the wakeup signal reception part 31.

The Wi-Fi function control part controls the Wi-Fi function of the mobile terminal 3 in accordance with a wakeup signal received by the wakeup signal reception part 31. To be specific, when the wakeup signal reception part 31 receives a wakeup signal, the Wi-Fi function control part switches the Wi-Fi of the mobile terminal 3 including this wakeup signal reception part 31 from off to on.

As described above, the mobile terminal 3 includes the wakeup signal reception part 31 and the Wi-Fi function control part. Therefore, the mobile terminal 3 can receive the wakeup signal 41 regularly transmitted by the Wi-Fi base station 2 and switch the Wi-Fi of this mobile terminal 3 from off to on.

Further, as described before, the Wi-Fi base station 2 regularly transmits the connection information 42 and the authentication process information 43 in addition to the wakeup signal 41. Therefore, after turning on the Wi-Fi, the mobile terminal 3 can make a connection request by using the connection information received by the wakeup signal reception part 31. To be specific, the mobile terminal 3 requests the Wi-Fi base station 2 (the network) shown by the connection information to connect with a channel shown by the connection information. In other words, the mobile terminal 3 can instantly execute a connection process without the need for scanning the connection information.

Furthermore, after the Wi-Fi base station 2 and the mobile terminal 3 connect to each other through the abovementioned process, the mobile terminal 3 can request the Wi-Fi base station 2 to execute an authentication process on the basis of the authentication process information 43 received by the wakeup signal reception part 31. In other words, the mobile terminal 3 previously receives necessary information for the authentication process, with the result that it is possible to reduce a time to execute the authentication process at the time of connection.

That is the configuration of the communication system 1 in this exemplary embodiment. Such a configuration allows the communication system 1 to rapidly establish communication by using the wakeup signal 41.

Next, the operation of a general communication system and the operation of the communication system 1 in this exemplary embodiment will be described referring to FIGS. 5 and 6.

(Operation)

First, referring to FIG. 5, the operation of the AP 5 (the Wi-Fi base station) and the STA 6 (the mobile terminal) in connecting to each other in a general communication system will be described. Hereinafter, let us suppose the AP 5 is configured to be able to transmit a wakeup signal and the STA 6 is configured to be able to receive and process the wakeup signal.

First, the AP 5 transmits a wakeup signal regularly at predetermined intervals.

Therefore, when entering the range of the cell of the AP 5, the STA 6 receives the wakeup signal regularly transmitted by the AP 5. Then, the STA 6 having received the wakeup signal switches the Wi-Fi from off to on.

Subsequently, the STA 6 having turned on the Wi-Fi scans from ch0 to ch13 and checks the names of APs present in an area where communication is available. Then, the STA 6 determines the name of an AP to connect in accordance with an algorithm of the STA 6 from among the checked AP names and sends a connection request to the AP (in FIG. 5, the AP 5). After that, the AP 5 having received the connection request responds that it connects. Consequently, the STA 6 connects to the AP 5 (connects to a wireless LAN).

Subsequently, the STA 6 sends a request for authentication data to the AP 5 and acquires information of the authentication data from the AP 5. Then, the STA 6 makes an authentication request by using the acquired information of the authentication data. In response to the authentication request by the STA 6, the AP 5 performs authentication. In a general communication system, connection between the AP 5 and the STA 6 is established through the abovementioned operation.

Thus, in a general communication system, the name of an AP to connect and a channel are unknown when the Wi-Fi is turned on, so that there is a need to scan all the channels and collect connection information. Moreover, for Wi-Fi connection, an AP needs to authenticate an unspecified terminal, and therefore, needs to acquire necessary information for authentication every time before executing an authentication process. Therefore, in a general communication system, it takes time before communication is established.

Next, the operation of the Wi-Fi base station 2 (the AP) and the mobile terminal 3 (the STA) in connecting to each other in the communication system 1 of this exemplary embodiment will be described referring to FIG. 6.

The Wi-Fi base station 2 (the wakeup signal transmission part 21 thereof) in this exemplary embodiment regularly transmits, in addition to the wakeup signal 41, the connection information 42 composed of the network name information 421 and the used channel information 422 and the authentication process information 43 at predetermined intervals.

Thus, when entering the range of the cell of the Wi-Fi base station 2, the mobile terminal 3 receives the wakeup signal 41, connection information 42 and authentication process information 43 regularly transmitted by the Wi-Fi base station 2. Then, the mobile terminal 3 having received the wakeup signal 41, the connection information 42 and the authentication process information 43 executes a process, which will be described later, by using the wakeup signal 41, the connection information 42 and the authentication process information 43.

First, the Wi-Fi function control part of the mobile terminal 3 controls the Wi-Fi function of the mobile terminal 3 in accordance with the wakeup signal received by the wakeup signal reception part 31. To be specific, the Wi-Fi function control part of the mobile terminal 3 switches the Wi-Fi of this mobile terminal 3 from off to ON.

After turning on the Wi-Fi, the mobile terminal 3 sends a connection request, which is a request for connection, to the Wi-Fi base station 2 corresponding to the connection information received by the wakeup signal reception part 31, with a channel shown by the connection information. Upon receiving the connection request, the Wi-Fi base station 2 sends a connection response. Through such operation, the mobile terminal 3 can connect to a wireless LAN.

After the Wi-Fi bas station 2 and the mobile terminal 3 connect to each other (after connect to the wireless LAN), the mobile terminal 3 sends an authentication request to the Wi-Fi base station 2 on the basis of the authentication process information 43 received by the wakeup signal reception part 31. Upon receiving the authentication request, the Wi-Fi base station 2 sends an authentication response. Through such operation, connection between the Wi-Fi base station 2 and the mobile terminal 3 is established.

That is the operation of the Wi-Fi base station 2 and the mobile terminal 3 when connecting to each other in the communication system 1 in this exemplary embodiment.

Thus, when transmitting the wakeup signal 41, the Wi-Fi base station 2 in this exemplary embodiment transmits the connection information 42 composed of the network name information 421 and the used channel information 422, in addition to the wakeup signal 41. Such a configuration allows the mobile terminal 3 having received the wakeup signal 41 and thereby turned on the Wi-Fi to make a connection request by using the connection information received simultaneously with the wakeup signal 41. In other words, the need for scanning channels and so on before making a connection request is eliminated. As a result, the communication system 1 including the mobile terminal 3 and the Wi-Fi base station 2 can speedily establish communication.

Further, when transmitting the wakeup signal 41, the Wi-Fi base station 2 transmits the authentication process information 43, in addition to the wakeup signal 41. Such a configuration allows the mobile terminal 3 having connected to the wireless LAN to make an authentication request on the basis of the authentication process information 43. In other words, the need for sending a request for authentication data to the Wi-Fi base station 2 before making the authentication request is eliminated. As a result, the communication system 1 including the mobile terminal 3 and the Wi-Fi base station 2 can speedily establish communication.

In this exemplary embodiment, Wi-Fi is given as an example of a wireless system. However, the present invention can be applied to a wireless system with wakeup other than Wi-Fi. For example, the present invention can be applied to a wireless communication system in a near field communication network typified by Bluetooth and ZigBee.

Because the configuration in this case is the same as the configuration when Wi-Fi is used, a description thereof will be omitted.

Further, in this exemplary embodiment, a mobile terminal such as a smartphone is given as an example of a wireless terminal. However, the practice of the present invention is not limited to use of a mobile terminal. In the practice of this exemplary embodiment, it is possible to use, instead of a mobile terminal, a personal computer, a sensor node, a power meter and the like including a wireless communication function.

Second Exemplary Embodiment

Next, a second exemplary embodiment of the present invention will be described referring to FIGS. 7 to 9. FIG. 7 is a diagram showing a configuration in transmitting a wakeup signal and so on expressed with the frame length of a radio frame. FIG. 8 is a diagram showing an example of a bit string and frame length correspondence table stored by the wakeup signal transmission part 21 of the Wi-Fi base station 2. FIG. 9 is a diagram showing an example of a frame length and bit string correspondence table stored by the wakeup signal reception part 31 of the mobile terminal 3.

In the second exemplary embodiment, an example of a specific way of transmission of transmission signal information including a wakeup signal transmitted by the wakeup signal transmission part 21 of the Wi-Fi base station 2 described in the first exemplary embodiment. Therefore, this exemplary embodiment has a similar configuration to that of the first exemplary embodiment. An overlapped part with the first exemplary embodiment has already been described, and therefore, a description thereof will be omitted.

As shown in FIG. 7, the wakeup signal transmission part 21 in this exemplary embodiment is characterized by transmitting transmission signal information including a wakeup signal by using radio frames expressed by frame lengths. To be specific, in this exemplary embodiment, as shown in FIG. 7, a case of transmitting the wakeup signal 41, the network name information 421 and the used channel information 422 expressed by the frame lengths of radio frames will be described.

As a radio frame, it is possible to use, for example, a beacon transmitted by the Wi-Fi base station 2 at regular intervals, a data frame transmitted to another mobile terminal by the Wi-Fi base station 2 and the like. Alternatively, a frame generated by using random values, not specific values, may be used.

Further, the wakeup signal 41 in this exemplary embodiment is configured to be able to designate a target to wake up. To be specific, the wakeup signal 41 (expressed by a bit string) in this exemplary embodiment includes terminal specification information specifying a terminal to wake up.

Below, a characteristic configuration in this exemplary embodiment will be described.

The wakeup signal transmission part 21 of the Wi-Fi base station 2 in this exemplary embodiment stores a bit string and frame length correspondence table shown in FIG. 8. Moreover, the wakeup signal transmission part 21 includes a frame length regulation unit (a control unit).

In the bit string and frame length correspondence table, information to be transmitted (a bit string for showing the information) and the frame length (μs) of a radio frame to be transmitted are stored in one-to-one correspondence. Therefore, the wakeup signal transmission part 21 can cause the frame length regulation unit which will be described later to regulate the frame length of a radio frame so that it shows information to be transmitted (a bit string showing the information) on the basis of the bit string and frame length correspondence table. After regulation of the frame length of the radio frame, the wakeup signal transmission part 21 transmits the radio frame having this regulated frame length.

The frame length regulation unit is realized, for example, by the wakeup signal transmission part 21 regulating the length of a payload, which is a data portion of a radio frame to be transmitted. Moreover, the frame length regulation unit is realized, for example, by the wakeup signal transmission part 21 regulating the rate of transmission of a radio frame. To be specific, for example, the frame length regulation unit of the wakeup signal transmission part 21 generates a radio frame having a payload length regulated to be nearest to a target frame length. Alternatively, the frame length regulation unit of the wakeup signal transmission part 21 regulates the rate of transmission of a radio frame so that the duration of a radio frame becomes a target frame length. By thus regulating, the wakeup signal transmission part 21 can transmit a radio frame having a frame length corresponding to a bit string.

Thus, the wakeup signal transmission part 21 is configured to be able to generate and transmit a radio frame having a regulated payload length, or regulate the rate of transmission of a radio frame to another terminal. Moreover, regulation of the frame length of a radio frame by the wakeup signal transmission part 21 is performed on the basis of the bit string and frame length correspondence table. Such a configuration allows the wakeup signal transmission part 21 to transmit a radio frame with a frame length corresponding to a bit string. In other words, the wakeup signal transmission part 21 in this exemplary embodiment can express the wakeup signal 41, the network name information 421 and the used channel information 422 with frame lengths of radio frames and transmit to the mobile terminal 3.

Next, the configuration of the mobile terminal 3 receiving the wakeup signal 41, network name information 421 and used channel information 422 transmitted by the abovementioned method will be described.

The wakeup signal reception part 31 of the mobile terminal 3 in this exemplary embodiment is configured to be able to detect a frame length by envelope detection. Detection of a frame length by using envelope detection allows detection of a frame length with a simple circuit and restriction of power consumption accompanied by the detection. Herein, a description of a configuration for performing envelope detection will be omitted because the configuration is a known technique.

Further, the wakeup signal reception part 31 stores a frame length and bit string correspondence table shown in FIG. 9. In the frame length and bit string correspondence table, the frame length of a received radio frame and a bit string corresponding to the frame length of the radio frame are stored in one-to-one correspondence. The wakeup signal reception part 31 detects the frame length of a received radio frame by using envelope detection. Then, the wakeup signal reception part 31 converts the detected frame length into a bit string by using the frame length and bit string correspondence table and acquires information.

After that, on the basis of the information acquired by the conversion into a bit string, the wakeup signal reception part 31 determines whether or not this terminal 3 matches terminal specification information shown by the received wakeup signal. In a case where the wakeup signal reception part 31 determines that the mobile terminal 3 including this wakeup signal reception part 31 is a target to wake up, the Wi-Fi function control part switches the Wi-Fi of this mobile terminal 3 from off to on. After that, the mobile terminal 3 attempts connection to the Wi-Fi base station 2 by using the received network name information 421 and used channel information 422.

Detection of a frame length using envelope detection by the wakeup signal reception part 31 is realized by, for example, performing envelope detection after passing through a band pass filter or the like, converting the detected signal into bit values, and measuring the bit values. To be specific, the wakeup signal reception part 31 measures the frame length of a radio signal by counting the number of bit values "1" before a bit value "0" is detected in the bit values converted through the abovementioned operation. Therefore, the frame length and bit string correspondence table showing a correspondence between a frame length and a bit string described above may use, instead of a frame length, the accumulation number of bit values showing the frame length of a radio frame. In other words, the wakeup signal reception part 31 may store a table showing a correspondence between the accumulation number of bit values and a bit string.

Further, in order to cope with interruption of a radio frame transmitted from another terminal, the wakeup signal reception part 31 can be configured to stand by for a predetermined time after receiving a radio frame from the Wi-Fi base station 2 (the wakeup signal transmission part 21 thereof). Because this configuration is a known technique, a detailed description thereof will be omitted.

In this exemplary embodiment, a correspondence between a bit string and a frame length is used as an example. However, the present invention can be embodied without being limited to the case described in this exemplary embodiment. For example, the information may be expressed with the frame length of a radio frame considering six bit strings as one group. Moreover, in this exemplary embodiment, the wakeup signal 41, the network name information 421 and the used channel information 422 are each expressed with the frame lengths of two radio frames. However, the present invention can be embodied without being limited to the case of expressing the wakeup signal and so on by the frame lengths of two radio frames.

Further, in this exemplary embodiment, a case of transmitting the wakeup signal 41, the network name information 421 and the used channel information 422 expressed with the frame lengths of radio frames is described. However, for example, the wakeup signal transmission part 21 may be configured to transmit by expressing not only the abovementioned information but also the authentication process information 43 with the frame lengths of radio frames.

Thus, the wakeup signal transmission part 21 of the Wi-Fi base station 2 in this exemplary embodiment has the bit string and frame length correspondence table. Moreover, the wakeup signal transmission part 21 has the frame length regulation unit. Further, the wakeup signal reception part 31 of the mobile terminal 3 has the frame length and bit string correspondence table. With such a configuration, the wakeup signal transmission part 21 can transmit transmission signal information including a wakeup signal expressed with the frame length of a radio frame to the mobile terminal 3. Further, the mobile terminal 3 can receive a wakeup signal and so on by receiving transmission signal information including a wakeup signal expressed with the frame length of a radio frame. As a result, it is possible to limit power consumption while the Wi-Fi is on standby, quickly start the Wi-Fi in response to the wakeup signal, and rapidly establish communication.

Third Exemplary Embodiment

Figure 11:
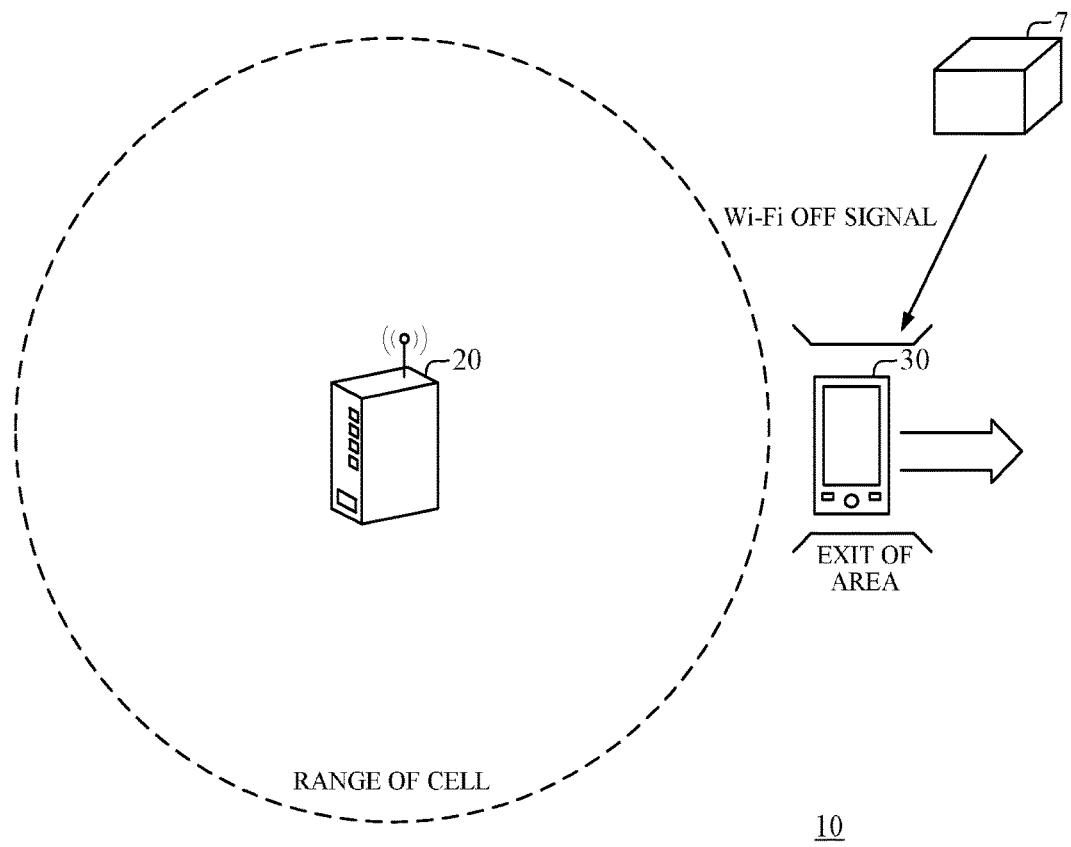
FIG. 11 is a diagram showing an example of the configuration of the communication system in the third exemplary embodiment.
Figure 12:
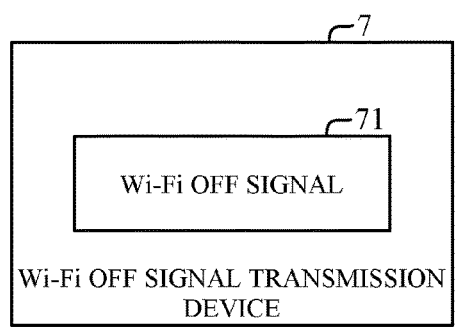
FIG. 12 is a block diagram showing the configuration of a signal transmitted by a Wi-FiOFF signal transmission device shown in FIG. 11.
Figure 13:
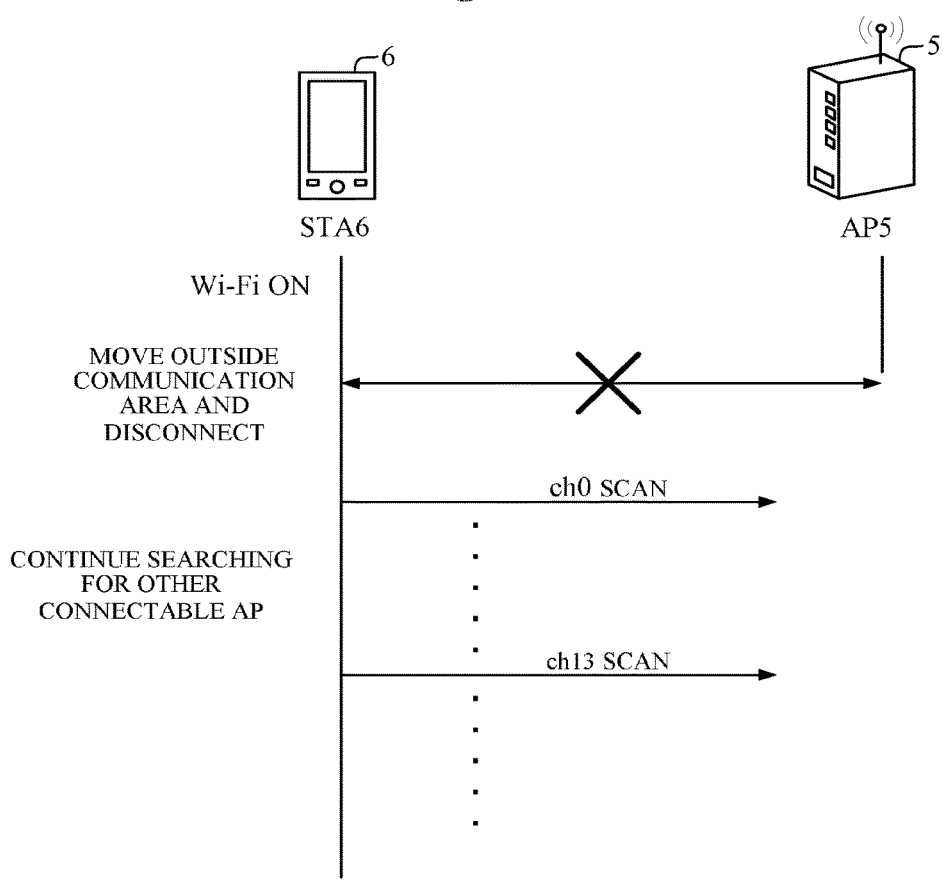
FIG. 13 is a sequence diagram showing the operation of a general communication system.
Figure 14:
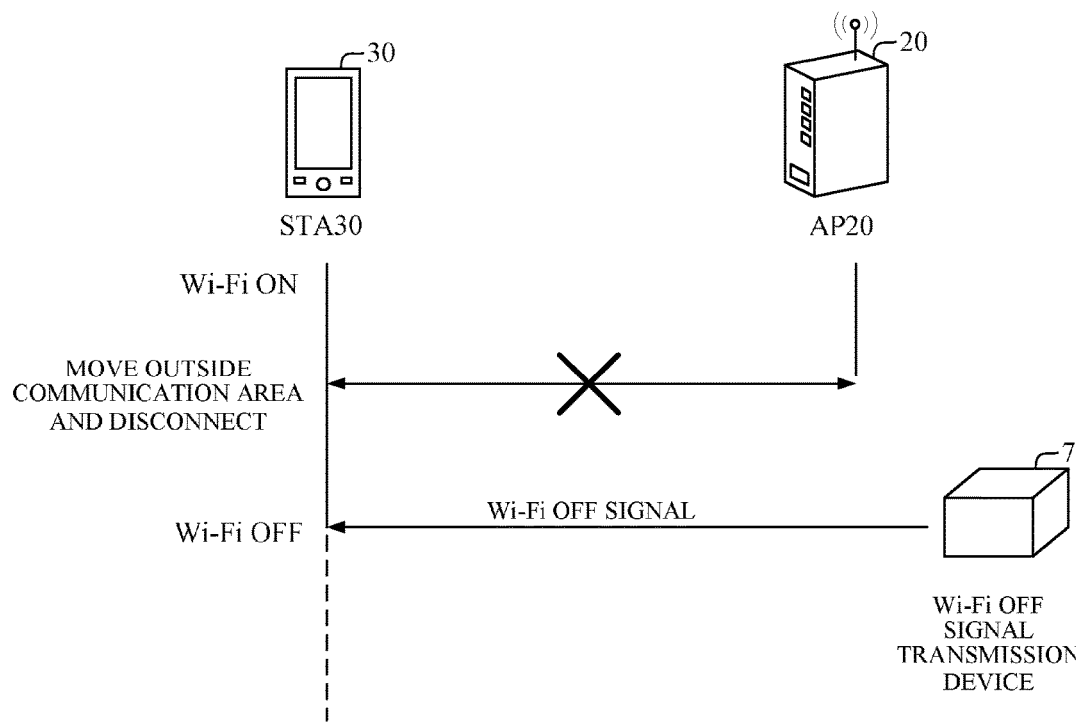
FIG. 14 is a sequence diagram showing the operation of the communication system in the third exemplary embodiment

Next, a third exemplary embodiment will be described referring to FIGS. 10 to 14. FIGS. 10 and 11 are diagrams showing the configuration of a communication system in this exemplary embodiment. FIG. 12 is a diagram showing the configuration of a signal transmitted by a Wi-FiOFF signal transmission device 7 shown in FIG. 11. FIG. 13 is a sequence diagram showing the operation of the AP 5 and the STA 6 in a general communication system. FIG. 14 is a sequence diagram showing the operation of the communication system 1 in the second exemplary embodiment.

(Configuration)

In the third exemplary embodiment, a communication system 10 including a Wi-Fi base station 20 and a mobile terminal 30 as shown in FIG. 10 will be described. To be specific, in this exemplary embodiment, a case where the mobile terminal 30 enters the range of the cell of the Wi-Fi base station 20 and turns on the Wi-Fi (establishing communication) and thereafter moves out of the range of the cell of the Wi-Fi base station 20 will be described.

The Wi-Fi base station 20 has the same configuration as the Wi-Fi base station 2 described in the first exemplary embodiment. That is to say, the Wi-Fi base station 20 in this exemplary embodiment includes the wakeup signal transmission part 21. Moreover, the wakeup signal transmission part 21 transmits the wakeup signal 41, the connection information 42 and the authentication process information 43. Because the respective components are the same as in the first exemplary embodiment, a description thereof will be omitted.

The mobile terminal 30 includes the same configuration as the mobile terminal 3 described in the first exemplary embodiment. That is to say, the mobile terminal 30 in this exemplary embodiment includes the wakeup signal reception part 31 and the Wi-Fi function control part. The configuration of the wakeup signal reception part 31 is the same as in the first exemplary embodiment. Therefore, a description of the wakeup signal reception part 31 will be omitted. The Wi-Fi function control part in this exemplary embodiment has the same configuration as in the first exemplary embodiment, and moreover, is configured to be able to switch the Wi-Fi function from on to off.

Further, the mobile terminal 30 (or the communication system 10) in this exemplary embodiment includes a Wi-Fi function stopping unit for switching the Wi-Fi function from on to off when connection using Wi-Fi (connection with the Wi-Fi base station 2 connected to the mobile terminal 3) is terminated.

The Wi-Fi function stopping unit is realized by, for example, providing the mobile terminal 30 with a timer function which measures a time elapsing after connection between the mobile terminal 30 and the Wi-Fi base station 20 is terminated. To be specific, when connection between the mobile terminal 30 and the Wi-Fi base station 20 is terminated, the timer function of the mobile terminal 30 measures a time elapsing after the connection is terminated. Then, in a case where the time elapsing after connection between the mobile terminal 30 and the Wi-Fi base station 20 is terminated exceeds a predetermined time, the timer function switches the Wi-Fi from on to off via the Wi-Fi function control part.

With such a configuration, it is possible to automatically turn off the Wi-Fi when there is no connection using the Wi-Fi. A general communication system needs to keep the Wi-Fi on to search for a Wi-Fi available place. Meanwhile, according to the present invention, use of a wakeup signal makes it possible to speedily switch the Wi-Fi from off to on. Thus, when there is no connection using the Wi-Fi (there is no Wi-Fi base station 20 which can connect to the mobile terminal 30), there is no need to keep the Wi-Fi on and it is possible to keep the Wi-Fi off.

Further, the Wi-Fi function stopping unit can be realized by, for example, as shown in FIG. 11, configuring the communication system 10 to transmit a Wi-FiOFF signal switching the Wi-Fi from on to off to a gate or the like where the mobile terminal 30 always passes when moving out of the range of the cell of the Wi-Fi base station 20.

To be specific, it is possible to realize the Wi-Fi function stopping unit of the communication system 10 by providing the communication system 10 with the Wi-Fi base station 20, the mobile terminal 30 and the Wi-FiOFF signal transmission device 7 as shown in FIG. 11.

The Wi-FiOFF signal transmission device 7 is a device placed near the gate or the like where the mobile terminal 30 always passes when moving out of the range of the cell. The Wi-FiOFF signal transmission device 7 is configured to be able to transmit a Wi-FiOFF signal 71 as shown in FIG. 12. As the Wi-FiOFF signal transmission device, for example, the Wi-Fi base station 20 configured to be able to transmit the Wi-FiOFF signal 71 can be used.

The Wi-FiOFF signal 71 is a signal which switches the Wi-Fi function of the mobile terminal 30 having received this Wi-FiOFF signal 71 from on to off. To be specific, when receiving the Wi-FiOFF signal 71, the wakeup signal reception part 31 switches the Wi-Fi from on to off via the Wi-Fi function control part. Such a configuration makes it possible to speedily switch the Wi-Fi of the mobile terminal 30 moving out of the range of the cell of the Wi-Fi base station 20 from on to off.

That is the configuration of the communication system 10 in this exemplary embodiment. Meanwhile, the Wi-Fi function stopping unit is not limited to the abovementioned case. For example, the Wi-Fi function stopping unit may be configured to use the timer function of the mobile terminal 30 and turn off the Wi-Fi when a given time elapses after the mobile terminal 30 last receives a wakeup signal. As described before, a wakeup signal is transmitted from the Wi-Fi base station 20 at regular intervals. Therefore, when a given time elapses after the mobile terminal 30 last receives a wakeup signal, the mobile terminal 30 is thought to have moved out of the range of the cell of the Wi-Fi base station 20. Thus, the Wi-Fi function stopping unit can be realized in any way as far as the Wi-Fi function of the mobile terminal 30 terminating wireless LAN connection can be turned off.

Next, the operation of the communication system 10 in this exemplary embodiment will be described referring to FIGS. 13 and 14.

(Operation)

First, the operation of a general communication system will be described referring to FIG. 13. In a general communication system, as shown in FIG. 13, the Wi-Fi of the mobile terminal 30 is still kept on after the mobile terminal 30 moves out of the range of the cell of the Wi-Fi base station 20. That is to say, the mobile terminal 30 regularly scans channels (searches for a Wi-Fi base station which is connectable next) after moving out of the range of the cell of the Wi-Fi base station 20.

On the other hand, according to the communication system 10 in this exemplary embodiment, as shown in FIG. 14, when the mobile terminal 30 moves out of the range of the cell of the Wi-Fi base station 20, the Wi-FiOFF signal transmission device 7 transmits the Wi-FiOFF signal 71, for example.

Then, the wakeup signal reception part 31 of the mobile terminal 30 receives the Wi-FiOFF signal 71 transmitted by the Wi-FiOFF signal transmission device 7. After that, the wakeup signal reception part 31 having received the Wi-FiOFF signal 71 switches the Wi-Fi from on to off via the Wi-Fi function control part.

Thus, the communication system 10 in this exemplary embodiment includes the Wi-Fi function stopping unit. Such a configuration allows the communication system 10 to switch the Wi-Fi of the mobile terminal 30 having moved out of the range of the cell of the Wi-Fi base station 20 from on to off. As a result, for example, it becomes possible to save power consumed in scanning channels.

Meanwhile, the Wi-FiOFF signal transmission device 7 described in this exemplary embodiment may be installed in a place other than the vicinity of the gate or the like where the mobile terminal always passes when leaving the range of the cell of the Wi-Fi base station 20. For example, it can be considered to install the Wi-FiOFF signal transmission device 7 at the entrance of an area where radio usage is prohibited, such as an airplane. By installing the Wi-FiOFF signal transmission device 7 at the entrance of an area where radio usage is prohibited, it is possible to automatically turn off the Wi-Fi of the mobile terminal 30 entering this entrance.

Fourth Exemplary Embodiment

Figure 15:
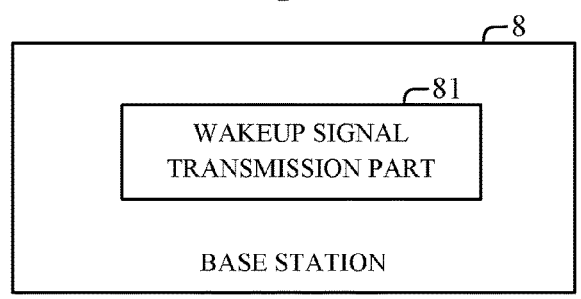
FIG. 15 is a block diagram showing the overview of the configuration of a base station 8 in a fourth exemplary embodiment.
Figure 16:
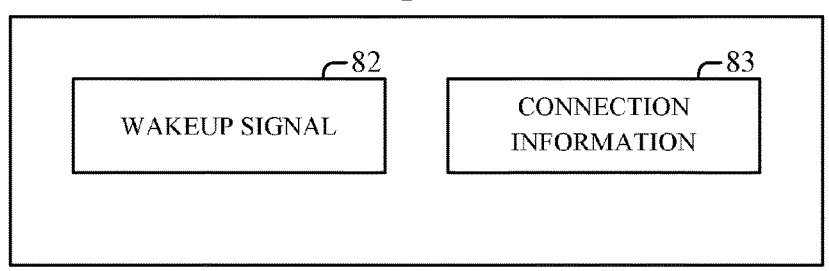
FIG. 16 is a block diagram showing the configuration of a signal transmitted by a wakeup signal transmission part shown in FIG. 15.

Next, a fourth exemplary embodiment of the present invention will be described with FIGS. 15 and 16. FIG. 15 is a block diagram showing the overview of the configuration of a base station 8 in the fourth exemplary embodiment. FIG. 16 is a block diagram showing the configuration of transmission signal information transmitted by the base station 8 shown in FIG. 15.

In the fourth exemplary embodiment, the base station 8 transmitting a wakeup signal will be described mainly. In this exemplary embodiment, the overview of the configuration of the base station 8 will be described.

The base station 8 in this exemplary embodiment includes a wakeup signal transmission part 81 as shown in FIG. 15. The wakeup signal transmission part 81 is a part which transmits transmission signal information including a wakeup signal to a wireless terminal.

As shown in FIG. 16, the wakeup signal transmission part 81 transmits a wakeup signal 82 and also connection information 83 as transmission signal information. Herein, the wakeup signal 82 is a signal which is transmitted to a wireless terminal and starts a given function included by the wireless terminal. The connection information 83 is information for a wireless terminal of the destination of transmission of the wakeup signal 82 to connect by wireless communication using a given function started by a wakeup signal.

Thus, the base station 8 in this exemplary embodiment includes the wakeup signal transmission part 81 which transmits the wakeup signal 82 and the connection information 83 as the transmission signal information. Such a configuration allows a wireless terminal 9 acquiring the transmission signal information from the base station 8 to receive the wakeup signal 82 and also receive the connection information 83. As a result, the wireless terminal 9 can start a given function with the wakeup signal 82 and also execute a process of connecting to the base station 8 by using the started given function and the connection information 83. In other words, the need for scanning the channels and the like is eliminated, and it becomes possible to speedily establish communication between the base station 8 and the wireless terminal 9.

Further, the base station described above can be realized by installing a given program into this base station. To be specific, a program as another aspect of the present invention is a program for causing the base station to realize a wakeup signal transmission unit which transmits transmission signal information including a wakeup signal starting a given function included by the wireless terminal to this wireless terminal in radio communication. Further, the wakeup signal transmission unit realized by such a program has a function of transmitting the wakeup signal and also the connection information for connecting a wireless terminal of the destination of transmission of the wakeup signal by wireless communication using a given function, as the transmission signal information to the wireless terminal.

Because the program having such a configuration has the same action as the base station 8, it can achieve the abovementioned object of the present invention.

Fifth Exemplary Embodiment

Figure 17:
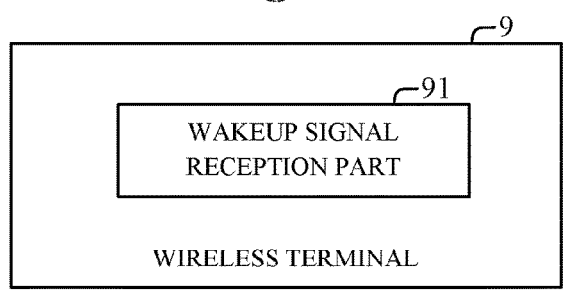
FIG. 17 is a block diagram showing the overview of the configuration of a wireless terminal 9 in a fifth exemplary embodiment.

Next, a fifth exemplary embodiment of the present invention will be described with FIG. 17. FIG. 17 is a block diagram showing the overview of the configuration of a wireless terminal 9.

In the fifth exemplary embodiment, the wireless terminal 9 receiving a wakeup signal and also connection information will be described. In this exemplary embodiment, the overview of the configuration of the wireless terminal 9 will be described.

The wireless terminal 9 in this exemplary embodiment includes a wakeup signal reception part 91 as shown in FIG. 17. The wakeup signal reception part 91 is a part which receives a wakeup signal and also connection information which is information for connecting to a base station by wireless communication using a given function, from the base station.

When the wakeup signal reception part 19 receives a wakeup signal and also connection information, the wireless terminal 9 first starts a given function in accordance with the wakeup signal. Then, the wireless terminal 9 executes a connection process by using the given function started in accordance with the wakeup signal and the connection information.

Thus, the wireless terminal 9 in this exemplary embodiment includes the wakeup signal reception part 91 which receives a wakeup signal and also connection information. Such a configuration allows the wireless terminal 9 to receive a wakeup signal and also connection information from a base station. As a result, the wireless terminal 9 starts a given function in response to the wakeup signal 82, and also executes a process of connecting to the base station 8 by using the started given function and the connection information 83. In other words, the need for scanning the channels is eliminated and it becomes possible to speedily establish communication between the base station 8 and the wireless terminal 9.

Further, the wireless terminal described above can be realized by installing a given program into this wireless terminal. To be specific, a program as another aspect of the present invention has a function of causing a wireless terminal to realize a wakeup signal reception unit which receives from a base station a wakeup signal and also connection information for connecting to the base station by wireless communication using a given function, starting a given function in accordance with the wakeup signal received by the wakeup signal reception unit, and executing a connection process by using the connection information with the started given function.

Because the program having such a configuration has the same action as the wireless terminal 9, it can achieve the abovementioned object of the present invention.

Sixth Exemplary Embodiment

Next, a sixth exemplary embodiment of the present invention will be described with FIG. 18. FIG. 18 is a block diagram showing the overview of the configuration of a communication system 100 composed of a base station 101 and a wireless terminal 103.

In the sixth exemplary embodiment, the communication system 100 composed of the base station 101 transmitting transmission signal information, and the wireless terminal 103 receiving transmission signal information transmitted by the base station 101 will be described. In this exemplary embodiment, the overview of the configuration of the communication system 100 will be described.

The communication system 100 in this exemplary embodiment includes the base station 101 transmitting transmission signal information and the wireless terminal 103 receiving transmission signal information transmitted by the base station 101 as shown in FIG. 18.

As shown in FIG. 18, the base station 101 includes a wakeup signal transmission part 102 which transmits transmission signal information including a wakeup signal causing the wireless terminal 103 to start a given function included by this wireless terminal 103 by wireless communication. Further, the wakeup signal transmission part 102 is configured to transmit the wakeup signal and also connection information for the wireless terminal 103 of the destination of transmission of this wakeup signal to connect by wireless communication using the given function, as transmission signal information to the wireless terminal 103.

The wireless terminal 103 receives the transmission signal information composed of the wakeup signal and the connection information. Then, upon receiving the wakeup signal and the connection information, the wireless terminal 103 starts a given function included by the wireless terminal 103 in accordance with the wakeup signal. After that, the wireless terminal 103 executes a connection process by using the connection information with the started given function.

Thus, the communication system 100 in this exemplary embodiment includes a base station 101 which transmits transmission signal information, and a wireless terminal 103 which receives the transmission signal information transmitted by the base station 101. Such a configuration allows the wireless terminal 103 to receive the transmission signal information composed of the wakeup signal and the connection information from the base station 101. As a result, the wireless terminal 103 can start a given function by using a wakeup signal, and also execute a process of connecting to the base station 101 by using the started given function and the connection information. In other words, the need for scanning channels is eliminated, and it becomes possible to speedily establish communication between the base station 101 and the wireless terminal 103.

Further, a communication method executed in the abovementioned communication system 100 is a communication method in which: a base station transmits a wakeup signal starting a given function included by a wireless terminal and connection information for the wireless terminal of the destination of transmission of the wakeup signal to connect by wireless communication using the given function, to the wireless terminal; the wireless terminal having received the wakeup signal and the connection information starts the given function in accordance with the wakeup signal; and a connection process is executed by using the communication information by the started given function.

Because the communication method having such a configuration has the same action as the communication system 100, it can achieve the abovementioned object of the present invention.

<Supplementary Notes>

The whole or part of the exemplary embodiments disclosed above can be described as following supplementary notes. Below, an information processing device and the like according to the present invention will be schematically described. However, the present invention is not limited to the following configurations.

(Supplementary Note 1)

A base station comprising a wakeup signal transmission part transmitting transmission signal information to a wireless terminal by wireless communication, the transmission signal information including a wakeup signal starting a given function included by the wireless terminal, wherein the wakeup signal transmission part transmits the transmission signal information including connection information in addition to the wakeup signal to the wireless terminal, the connection information being information for causing the wireless terminal of a destination of transmission of the wakeup signal to connect by wireless communication using the given function.

According to this configuration, a base station has a wakeup signal transmission part. The wakeup signal transmission part transmits connection information in addition to a wakeup signal. Such a configuration allows a wireless terminal having received the wakeup signal and the connection information from the base station to start a given function in response to the wakeup signal and connect to the base station by using the started given function and the connection information. That is to say, the need for scanning channels and so on is eliminated and speedy connection is available.

(Supplementary Note 2)

The base station according to Supplementary Note 1, wherein the wakeup signal transmission part transmits the connection information including network name information and used channel information, the network name information showing a name of a network to which the wireless terminal connects by wireless communication, and the used channel information showing a frequency band used in wireless communication.

According to this configuration, the connection information includes network name information and used channel information. Such a configuration allows the wireless terminal having received the connection information to attempt connection to a network (base station) shown by the network name information using a channel shown by the used channel information. As a result, the need for scanning channels and so on is eliminated and speedy connection to the base station (network) is available.

(Supplementary Note 3)

The base station according to Supplementary Note 2, wherein:

the given function is a function of connecting to the base station by wireless communication; and the network name information is ESSID, which is Extended Service Set Identifier.

(Supplementary Note 4)

The base station according to any of Supplementary Notes 1 to 3, wherein the wakeup signal transmission part transmits the transmission signal information including authentication process information in addition to the wakeup signal and the connection information, the authentication process information being information necessary for an authentication process performed between the wireless terminal and the base station.

According to this configuration, the wakeup signal transmission part transmits authentication process information in addition to the wakeup signal and the connection information. Such a configuration allows the wireless terminal having received the authentication process information to make an authentication request (a request for an authentication process) by using the authentication process information. As a result, the time for the authentication process at the time of connection is shortened.

(Supplementary Note 5)

The base station according to any of Supplementary Notes 1 to 4, wherein the wakeup signal transmission part is configured to be able to transmit a function stop signal stopping the given function included by the wireless terminal.

According to this configuration, the wakeup signal transmission part is configured to be able to transmit a function stop signal. Such a configuration makes it possible to stop the given function of the wireless terminal having received the function stop signal. As a result, it is possible to restrict power consumption when the given function operates.

(Supplementary Note 6)

The base station according to any of Supplementary Notes 1 to 5, wherein the wakeup signal transmission part transmits the transmission signal information to the wireless terminal by controlling a frame length of a transmitted radio frame.

According to this configuration, the wakeup signal transmission part is configured to transmit the transmission signal information to the wireless terminal by controlling the frame length of a transmitted radio frame. Herein, the frame length can be detected by a simple circuit. Therefore, such a configuration can restrict power consumed while the given function is standing by. As a result, it is possible to speedily establish communication in response to the wakeup signal while restricting power consumption while standing by.

(Supplementary Note 7)

A wireless terminal comprising a wakeup signal reception part receiving a wakeup signal and connection information from a base station, the connection information being information for connecting to the base station by wireless communication using a given function, the wireless terminal starting the given function in response to the wakeup signal received by the wakeup signal reception part, and executing a connection process by the started given function using the connection information.

(Supplementary Note 7-1)

The wireless terminal according to Supplementary Note 7, wherein the wakeup signal reception part receives authentication process information along with the wakeup signal and the connection information, the wireless terminal making a request for an authentication process by using the authentication process information received by the wakeup signal reception part.

(Supplementary Note 8)

A communication system, wherein:

a base station includes a wakeup signal transmission part transmitting transmission signal information to a wireless terminal by wireless communication, the transmission signal information including a wakeup signal starting a given function included by the wireless terminal;

the wakeup signal transmission part transmits the transmission signal information including connection information in addition to the wakeup signal to the wireless terminal, the connection information being information for causing the wireless terminal of a destination of transmission of the wakeup signal to connect by wireless communication using the given function; and upon receiving the transmission signal information including the wakeup signal and the connection information, the wireless terminal starts the given function included by the wireless terminal in response to the wakeup signal and executes a connection process by the started given function using the connection information.

(Supplementary Note 8-1)

The communication system according to Supplementary Note 8, wherein:

the wakeup signal transmission part transmits the transmission signal information including authentication process information in addition to the wakeup signal and the connection information, the authentication process information being information necessary for an authentication process performed between the wireless terminal and the base station; and the wireless terminal receives the authentication process information along with the wakeup signal and the connection information, and makes a request for the authentication process by using the authentication process information received by the wakeup signal reception part.

(Supplementary Note 9)

A communication method comprising:

by a base station, transmitting a wakeup signal and connection information to a wireless terminal, the wakeup signal starting a given function included by the wireless terminal, and the connection information being information for causing the wireless terminal of a destination of transmission of the wakeup signal to connect by wireless communication using the given function; and by the wireless terminal, starting the given function in response to the wakeup signal and executing a connection process by the started given function using the connection information when receiving the wakeup signal and the connection information.

(Supplementary Note 9-1)

The communication method according to Supplementary Note 9, wherein:

when transmitting the wakeup signal and the connection information to the wireless terminal, the base station transmits authentication process information in addition to the wakeup signal and the connection information, the authentication process information being information necessary for an authentication process performed between the wireless terminal and the base station; and after establishing wireless communication on a basis of the connection information, the wireless terminal makes a request for the authentication process by using the authentication process information.

(Supplementary Note 10)

A computer program comprising instructions for causing a base station to realize a wakeup signal transmission unit transmitting transmission signal information to a wireless terminal by wireless communication, the transmission signal information including a wakeup signal starting a given function included by the wireless terminal, wherein the wakeup signal transmission unit has a function of transmitting the transmission signal information including connection information in addition to the wakeup signal to the wireless terminal, the connection information being information for causing the wireless terminal of a destination of transmission of the wakeup signal to connect by wireless communication using the given function.

(Supplementary Note 10-1)

The computer program according to Supplementary Note 10, wherein the wakeup signal transmission unit has a function of transmitting authentication process information in addition to the wakeup signal and the connection information, the authentication process information being information necessary for an authentication process performed between the wireless terminal and the base station.

(Supplementary Note 10-2)

A computer program comprising instructions for causing a wireless terminal to realize a wakeup signal reception unit receiving a wakeup signal and connection information from a base station, the connection information being information for connecting to the base station by wireless communication using a given function, the computer program having a function of: starting the given function in response to the wakeup signal received by the wakeup signal reception unit; and executing a connection process by the started given function using the connection information.

The program described in the exemplary embodiments and supplementary notes is stored in a storage device or recorded on a computer-readable recording medium. For example, the recording medium is a portable medium such as a flexible disk, an optical disk, a magneto-optical disk and a semiconductor memory.

Although the present invention is described above referring to the exemplary embodiment, the present invention is not limited to the exemplary embodiments described above. The configurations and details of the present invention can be changed and modified in various manners that can be understood by one skilled in the art within the scope of the present invention.

The present invention is based upon and claims the benefit of priority from Japanese patent application No. 2013-234728, filed on Nov. 13, 2013, the disclosure of which is incorporated herein in its entirety by reference.

DESCRIPTION OF NUMERALS 1, 10 communication system
2, 20 Wi-Fi base station
21 wakeup signal transmission part
3, 30 mobile terminal
31 wakeup signal reception part
41 wakeup signal
42 connection information
421 network name information
422 used channel information
43 authentication process information
5 AP (Wi-Fi base station)
6 STA (mobile terminal)
7 Wi-FiOFF signal transmission device
71 Wi-FiOFF signal
8 base station
81 wakeup signal transmission part
82 wakeup signal 83 connection information
9 wireless terminal
91 wakeup signal reception part
100 communication system
101 base station
102 wakeup signal transmission part
103 wireless terminal

The invention claimed is:

1. A base station comprising a wakeup signal transmission part transmitting transmission signal information to a wireless terminal by wireless communication, the transmission signal information including a wakeup signal starting a given function included by the wireless terminal,
wherein the wakeup signal transmission part transmits the transmission signal information including connection information in addition to the wakeup signal to the wireless terminal, the connection information being information for causing the wireless terminal of a destination of transmission of the wakeup signal to connect by wireless communication using the given function,
wherein the wakeup signal transmission part regulates a frame length of a wireless frame so that the frame length includes the transmission signal information, and transmits the transmission signal information that includes the wakeup signal and the connection information and is expressed by the frame length of the wireless frame.

2. A wireless terminal comprising:
a wakeup signal reception part receiving from a base station a transmission signal, expressed by a frame length of a wireless frame, that includes a wakeup signal and connection information, the connection information being information for connecting to the base station by wireless communication using a given function,
the wireless terminal starting the given function in response to the wakeup signal received by the wakeup signal reception part, and executing a connection process by the started given function using the connection information,
wherein the transmission signal has a radio frame with a controlled frame length.

3. A communication system, wherein:
a base station includes a wakeup signal transmission part transmitting transmission signal information to a wireless terminal by wireless communication, the transmission signal information including a wakeup signal starting a given function included by the wireless terminal;
the wakeup signal transmission part transmits the transmission signal information including connection information in addition to the wakeup signal to the wireless terminal, the connection information being information for causing the wireless terminal of a destination of transmission of the wakeup signal to connect by wireless communication using the given function; and
upon receiving the transmission signal information including the wakeup signal and the connection information, the wireless terminal starts the given function included by the wireless terminal in response to the wakeup signal and executes a connection process by the started given function using the connection information,
wherein the wakeup signal transmission part regulates a frame length of a wireless frame so that the frame length includes the transmission signal information, and transmits the transmission signal information that includes the wakeup signal and the connection information and is expressed by the frame length of the wireless frame.

4. A communication method comprising:
by a base station, transmitting a wakeup signal and connection information to a wireless terminal, the wakeup signal starting a given function included by the wireless terminal, and the connection information being information for causing the wireless terminal of a destination of transmission of the wakeup signal to connect by wireless communication using the given function;
by the wireless terminal, starting the given function in response to the wakeup signal and executing a connection process by the started given function using the connection information when receiving the wakeup signal and the connection information; and
regulating a frame length of a wireless frame so that the frame length includes the transmission signal information,
wherein the transmission signal information that includes the wakeup signal and the connection information and is expressed by the frame length of the wireless frame is transmitted.

5. A non-transitory computer-readable medium storing a program comprising instructions for causing:
a base station to realize a wakeup signal transmission unit transmitting transmission signal information to a wireless terminal by wireless communication, the transmission signal information including a wakeup signal starting a given function included by the wireless terminal, wherein the wakeup signal transmission unit has a function of transmitting the transmission signal information including connection information in addition to the wakeup signal to the wireless terminal, the connection information being information for causing the wireless terminal of a destination of transmission of the wakeup signal to connect by wireless communication using the given function, and the instructions further cause the base station to:
regulate a frame length of a wireless frame so that the frame length includes the transmission signal information, wherein the wakeup signal transmission unit transmits the transmission signal information that includes the wakeup signal and the connection information and is expressed by the frame length of the wireless frame.

6. The base station according to claim 1, wherein the wakeup signal transmission part transmits the connection information including network name information and used channel information, the network name information showing a name of a network to which the wireless terminal connects by wireless communication, and the used channel information showing a frequency band used in wireless communication.

7. The base station according to claim 6, wherein:
the given function is a function of connecting to the base station by wireless communication; and
the network name information is ESSID, which is Extended Service Set Identifier.

8. The base station according to claim 1, wherein the wakeup signal transmission part transmits the transmission signal information including authentication process information in addition to the wakeup signal and the connection information, the authentication process information being information necessary for an authentication process performed between the wireless terminal and the base station.

9. The base station according to claim 1, wherein the wakeup signal transmission part is configured to be able to transmit a function stop signal stopping the given function included by the wireless terminal.

* * * * *